United States Patent [19]

Lewis

[11] 3,883,351

[45] May 13, 1975

[54] METHOD OF MAKING A PHOTORESIST

[75] Inventor: James M. Lewis, Aurora, Ohio

[73] Assignee: Horizons Incorporated, Cleveland, Ohio

[22] Filed: Mar. 25, 1974

[21] Appl. No.: 454,540

Related U.S. Application Data

[62] Division of Ser. No. 224,939, Feb. 9, 1972, abandoned.

[52] U.S. Cl. ................. 96/35.1; 96/90 R; 96/115 P

[51] Int. Cl. ................................................ G03c 1/70

[58] Field of Search ................ 96/115 P, 90 R, 35.1

[56] References Cited

UNITED STATES PATENTS

| | | | |
|---|---|---|---|
| 3,157,505 | 11/1964 | Notley | 96/115 P |
| 3,275,443 | 9/1966 | Wainer | 96/90 R |
| 3,279,919 | 10/1966 | Laridon et al. | 96/115 P |
| 3,458,311 | 7/1969 | Alles | 96/115 P |
| 3,510,304 | 5/1970 | Fichter et al. | 96/90 R |
| 3,512,975 | 5/1970 | Munder et al. | 96/90 R |
| 3,674,494 | 7/1972 | Hoffmann et al. | 96/115 P |

*Primary Examiner*—Ronald H. Smith
*Attorney, Agent, or Firm*—Lawrence I. Field

[57] ABSTRACT

A photosensitive material and its use as a photoresist, the material comprising otherwise known photosensitive compositions dissolved in or dispersed in a binder which is a suitable vinyl compound such as a vinyl ester, ketone, or keto ester, suitable vinyl compounds being those which are soluble in alcohols or in azeotropes of alcohols and water.

3 Claims, No Drawings

METHOD OF MAKING A PHOTORESIST

This is a division of application Ser. No. 224,939, filed Feb. 9, 1972, now abandoned.

This invention relates to a photosensitive material which can be applied to virtually any surface including both metallic (copper, aluminum, chromium, etc.) and non-metallic surfaces (glass, synthetic resins, including polyethylene terephthalate, or paper, etc.) by any known conventional methods of coating such as roll coating, dip coating, spray coating, spin coating, and other known methods.

The resulting coating composition when exposed to a suitable dose of properly selected electromagnetic energy is converted to a material which is unaffected by acids and alkalies and which is particularly useful as a photoresist. The material is also useful as a protective coating for conduits or other containers or other surfaces which may come into contact with corrosive fluids, in normal service.

BACKGROUND OF THE DISCLOSURE

U.S. Pat. No. 3,042,517 describes a dry working composition based on a combination of vinyl monomers taken from the class of N-vinyl compounds, organic halogen compounds, and aryl amines dissolved in an organic binder which, when exposed to light, and suitably dry processed will produce a color. U.S. Pat. No. 3,042,519 and U.S. Pat. No. 3,046,125 describe a similar organic soluble composition which may be utilized as photoresists which produce a color on processing and which is made available for photoresist purposes by treatment with an organic solvent. A large number of issued U.S. Patents define compositions containing sources of free-radicals which produce color on exposure to light either directly or as a consequence of heating or a combination of optical development and heating. In general, the source of the color is a complex substituted amine, coupled with an activator or initiator. These complex amines are described in a host of U.S. Pat. Nos., such as 3,510,304; 3,042,515; 3,042,517; 3,046,125; 3,046,209; 3,056,673; 3,164,467; 3,095,303; 3,100,703; 3,102,810; 3,342,603; 3,102,029; 3,106,466; 3,109,736; 3,272,635; 3,284,205; 3,342,595; 3,377,167; 3,285,744; and, 3,342,602. A special class of amines combined with other agents operate as color couplers in the presence of these activators and these are described in U.S. Pat. No. 3,533,792 and U.S. Pat. No. 3,539,346. These color coupling systems usually operate through the medium of specific classes of activators taken from the class of complex amines of the bis-diamino class, coupled with such compounds as pyrazoles, pyrazolones, mercapto, and thiol compounds, acetanilides and substituted acetanilides, and phenols. Activators which enable these color forming reactions to take place on exposure to light and/or electron beams are described in U.S. Pat. Nos. 3,042,515; 3,121,632; 3,121,633; 3,113,024; 3,284,205; 3,140,948; 3,140,949; 3,272,635; 3,445,232; 3,285,744; 3,342,595; 3,342,602; 3,342,603; 3,342,604; and, 3,359,105.

Compositions involving ethylenically unsaturated monomers taken from the N-vinyl compound class and organic halogen compounds which produce free-radicals on exposure to light and electron beams are described as both light sensitive and electron beam sensitive materials in U.S. Pat. No. 3,147,117.

Compositions involving organic halogen compounds and N-vinyl compounds as the base system and which contain materials taken from the class of aryl compounds of certain metals for the prevention of thermal fog on processing and on storage are described in U.S. Pat. No. 3,275,443. Compositions useful for photoresist purposes and comprising various mixtures of ethylenically unsaturated monomers, crosslinking agents and the like and useful for the manufacture of lithographic plates and printed circuits and including the use of crosslinking agents are described in U.S. Pat. No. 3,330,659. Compositions describing a combination of N-vinyl compounds, free-radical initiators, and various binding agents are described in U.S. Pat. No. 3,374,094. This reference is significant for the purpose of this application in that in order to produce the hydrophilic-hydrophobic requirements for yielding a planographic-lithographic type printing plate, water emulsions of specific ingredients may be eliminated as defined in Column 6 of the referenced patent.

U.S. Pat. No. 3,443,945 further describes the capability for a combination of N-vinyl compounds and certain organic amines to produce color on exposure to light and suitable processing, this description being classified as an extension of U.S. Pat. No. 3,042,517. U.S. Pat. No. 3,486,898 further describes the color forming characteristics of combination of N-vinyl compounds and aryl and/or heterocyclic amines in the presence of the free-radical initiator.

U.S. Pat. No. 3,525,616 describes a combination of a N-vinyl carbazole, (a member of the class of N-vinyl compounds), a light sensitive halogen hydrocarbon source of free-radical, and a leuco triaryl methane dye. This composition is normally developed for resist purposes by washing in an organic solvent.

U.S. Pat. No. 3,563,749 describes a combination of N-vinyl compounds, dyes of the merocyanine class and a halogentated hydrocarbon with a suitable polymeric binder which is dissolved in an organic solvent. After exposure to light and suitable processing, the plate is then developed by wiping with cold water. The principal application defined in this patent is for printing purposes involving such bases as paper, aluminum, copper, zinc, magnesium, and certain plastic foils. It is significant to note that the only solvents specifically described in U.S. Pat. No. 3,563,749 are petroleum ether and acetone.

The disclosures of each of the prior art patents noted above are intended to be incorporated herein by reference.

It is seen that a relatively huge volume of patent literature exists dealing with the color and/or resist reactions which develop when combinations of certain complex organic amines and halogenated hydrocarbons in a suitable binder are exposed to light and thereafter processed.

The ideal photoresist composition for use in a variety of fields, such as lithography, letterpress printing, manufacture of printed circuits, preparation of microelectronic circuits, chemical milling and other photomechanical applications must exhibit an extremely wide range of chemical, physical and mechanical properties in order to make the ideal composition useful to its fullest extent in all of these applications. None of the above noted references define materials which produce a light and/or electron beam result when exposed to this type of radiation exhibit this combination of ideal properties. Nor does any normal combination of this vast art exhibit this combination of ideal properties.

In order not only to define the deficiencies of the prior art and to establish the novelty of the present invention, a partial list of some of these ideal properties will be given.

Among the most desirable properties for an all-purpose photoresist are the following:

1. On exposure to light, it should have a speed sufficient so as to make it useful for projection printing. This means that the photographic speed for full exposure should be in the range of 25 millijoules, or less. When color formers are present, photographic speed is designated as the number of millijoules required to yield a density of 1.0 units above base plus fog.

2. For contact printing, and to ensure the maintenance of the highest resolution possible, the photographic speed should be capable of being slowed down and should be in the range of 50 to 150 millijoules.

3. The spectral sensitivity of the resist should be controllable. Not only is spectral sensitivity to the panchromatic visible desirable, but also the composition should be capable of modification so that it exhibits no sensitivity whatsoever to the visible and is sensitive only in the ultraviolet range available from inexpensive light source.

4. No matter what the spectral sensitivity to light, the material should exhibit electron beam sensitivity.

5. The same composition should be capable of exhibiting both positive and negative working characteristics.

6. Prior to development with any reagent whether water borne or not, the image produced by light and/or electron beams should be easily visible so that the exposed layer, developed without the use of solvent, is permanent, fully fixed, and showing sufficient color differential so that it is entirely suitable for image reproduction purposes only, if desired.

7. The photoresist composition in solution form, in dried form placed on a chosen base or substrate, or in free dried film form should have adequate shelf life for commercial utility; and such adequate shelf life is designated as being at least 6 months or longer, at room temperature, without significant loss of photosensitive, chemical and physical properties.

8. The material should be capable of being applied to substantially any kind of surface, including metals, alloys, plastics, paper, wood, cloth and the like without deterioration of its properties and shelf stable characteristics.

9. The material should be capable of being made available in free film form, i.e., without any support provided by a substrate.

10. Irrespective of the nature of the support on which the material is placed, the material should be capable, after exposure and development, of adhering strongly to such support and maintaining such adherence through subsequent operation, particularly exposure to highly corrosive chemical agents.

11. When placed in solution form (organic solvent) needed to make it applicable to the various surfaces described, the material should be completely soluble in a wide variety of organic solvents so that all of the reagents needed to achieve the ideal characteristics are made available for the full purposes of the photoresist. Such solvents may be alcohols, glycols, cellosolves, chlorinated solvents, hydrocarbons, amine type solvents, ethers, ketones, esters, and combination thereof.

12. The resist whether exposed or unexposed should be insoluble in a variety of organic reagents, such as high molecular weight aliphatic hydrocarbons, glycerine, trichloroethylene, kerosene, mineral oils, and vegetable oils, these being normal components of lithographic and printing inks.

13. Ideally, after exposure and development, the non-image areas should be easily soluble in cold to warm pure water and the developed-out and processed image areas should be soluble in hot pure water.

14. No matter how comprised, developed and/or fixed, the resist on the image areas after water development should not only be soluble in hot pure water but easily soluble in cold ketones and alcohols which have a tolerance for water, such as acetone, methyl alcohol, and ethyl alcohol. Again, ideally, higher boiling point solvents should be capable of stripping the image by vapor degreasing techniques. Such materials may be taken from the class of isopropyl alcohol, the cellosolves, dimethylformamide, tertiary butanol, butyl acetate, and the like. Removal is necessary after a printed circuit has been produced in order to expose it for a subsequent operation, such as soldering connections.

15. The image should be insoluble in hot or cold water containing as little as 0.5 percent dissolved alkali, acid and/or neutral salts of any description.

16. The exposed, developed, and fixed-out image areas containing a covering of finished and processed photoresist should be capable of withstanding the action of hot aqueous solutions whether dilute or concentrated of substantially any description. Such hot aqueous solution may contain strong alkalies, such as sodium hydroxide, or potassium hydroxide, strong acids, such as hydrochloric, nitric, sulphuric, chromic, phosphoric, hydrofluoric, and the like and mixtures thereof, strong acid salts, such as ferric chloride, cupric chloride, acid fluorides, aqua regia, ferricyanide-hydroxide mixtures, and the like. In summary, the exposed and developed-out resist must withstand an extremely wide range of either acid or alkali contact in concentrated form for periods of time extending in some cases to an excess of 2 hours without notable attack on the resist areas, thus extending and ensuring the possibilities for deep etching and thruput chemical milling.

While the foregoing list does not cover all of the ideal characteristics of the photoresist for the various applications which have been listed, the prior art patent evidence which has been listed has been sufficiently defined so as to show that none of the patents cited describe compositions which are capable of fulfilling all of these objectives, nor is any combination thereof capable of fulfilling all of these objectives. The compositions of this invention achieve the ideal conditions indicated in the foregoing list and others which are also of value for the consumer.

A number of negatively working photoresists are presently available commercially. In general when these materials are exposed to the action of caustic materials or reagents, they are degraded to an extent which is more than is acceptable for some purposes. Furthermore the known, negative working resists usually possess relatively poor resolution characteristics. Still another disadvantage common to known negative photoresists is that they are exceptionally slow photographically even though exposed with light of a wavelength which is comparable to the wavelength of peak absorption. Thus, negative photoresists normally will show an exposure speed in millijoules per square centimeter in the range of 500 to 5000 millijoules. Finally, negative photoresists require rather strong reagents or complicated organic materials in order to develop them after exposure and none of them insofar as I am aware can be developed with an alcohol or with an azeotrope of an alcohol and water.

The photoresist of the present invention overcomes the above mentioned defects in presently known negative working resists and in addition possesses unexpected advantages over prior art resists.

Normally, in using a negative photoresist the greater the thickness, the faster the material, photographically speaking. In order to obtain good resolution of a micro character, however, it is necessary for the resist to be applied as thin as possible and under these conditions the usual negative photoresist becomes proportionately slower. The reverse is true in the case of the resist of the present invention. With this invention, the thinner the resist (i.e. the greater the degree of resolution which is obtainable as a consequence of such thinness) the faster the photographic response.

THE PRIOR ART

Compositions which contain two or more of the following constituents, or various combinations of the same are described in many of the patents issued to Eugene Wainer and his co-workers including those listed in Column 2 of U.S. Pat. 3,510,104 and others. The disclosures of these patents are intended to be incorporated herein by reference. The present invention utilizes compositions similar to those described in the prior art, except for the presence therein of a specific kind of resin binder which when present in properly formulated compositions is converted to an acid-resistant, alkali-resistant reaction product. The disclosure of copending U.S. patent application Ser. No. 141,393 filed May 7, 1971 and issued as U.S. Pat. No. 3,769,023 on Oct. 30, 1973 is particularly pertinent as a disclosure of compounds intended to be included in the following groups and is incorporated by reference for that purpose, in the present application.

The compositions of the present invention comprise at least one of each of the following groups of constituents:

I. Polymerizable Monomer
a. N-vinyl amine (heterocyclic, aryl, other)
b. N-vinyl amide and/or N-vinyl imide
c. Other monomers as hereinafter described.
II. Activator
a. Organic halogen compound
b. Sulfonyl and sulfenyl halides
c. Mercapto compound
III. Basic (alkaline) Stabilizer
a. Phenolic compound
b. Organic amine (other than polymerizable monomer of I)
c. Inorganic base
IV. Resin Binder
a. Polyvinyl butyral
b. Polyvinyl alcohol-vinylacetate
c. Polyvinyl acetate
d. Vinyl chloride-vinylacetate copolymer
e. Polyvinyl propionate
f. Polyvinyl butyrate
g. Copolymer of Polystyrene and Polysulfone
h. Ketone resin and may contain one or more of the following optional constituents:

V. Antifogging agent
a. Triaryl compound of Sb, As, Bi or P
VI. Sensitizer
a. Optical sensitizer to selected radiation
VII. Color Forming Components
a. Various dyes as hereinafter set forth
VIII. Cross linking agents

I POLYMERIZABLE MONOMER

At least one ethylenically unsaturated monomer capable of polymerization is an acquired constituent of the compositions of this invention. Suitable N-vinyl amines and N-vinyl amides and imides include those listed in U.S. Pat. 3,042,517, and include N-vinyl compounds in which the N atom is attached to an aryl nucleus, or is a member of a heterocyclic nucleus. Other monomers may be used including those listed below:

A. N-Vinyl Amines (Heterocyclic and Aryl)
1. N-vinylindole
2. N-vinylcarbazole
3. N-vinylphenyl-alpha-naphthylamine
4. N-vinylpyrolle
5. N-vinyldiphenylamine (stabilized with 0.1 percent cyclohexylamine)
6. 3,6-dimethyl-N-vinylcarbazole
7. 3-(2 hydroxy-1-naphthylazo)-9-vinylcarbazole
8. 3-(9′ xanthyl)-9-vinylcarbazole
9. 9-vinyl-(2′3′:3,4)-naphthcarbazole
10. 9-vinyl-3-(p-hydroxyanilino)-carbazole
11. 3-indole-phenol-9-vinylcarbazole
12. 3-indole-phenol azo-9-vinylcarbazole
B. N-Vinyl Amides and Imides
1. N-vinylsuccinimide
2. N-vinylphthalimide
3. N-vinylpyrollidone
4. N-vinyl-N-phenylacetamide
5. N-vinyl-N-methylacetamide
6. N-vinyldiglycalimide
7. N-vinylimidazole
C. Vinyl Monomers
1. Styrene
2. 50 styrene - 50 maleic anhydride
3. p-cyanostyrene
*4. Vinylnaphthalene
5. 9-methylene fluorene
6. Methylmethacrylate
7. Methylacrylate
8. Acrylonitrile
*9. Acrylamide
*10. Methylacrylamide
*11. N, N-diphenylacrylamide
12. Vinylacetate
13. 50 vinylacetate - 50 maleic anhydride
14. Ethylmethacrylate
15. Ethylacrylate
16. Butylmethacrylate
*17. Methylacrylanilide
*18. N-N″-diphenylmethylacrylamide
*19. N-phenylacrylamide
20. Methylvinylketone
*21. N-N′-methylenebisacrylamide The various classes of monomers require different methods of processing depending on their nature. In summary, the N-vinyl amines listed in Table 1 (A) may be utilized readily and easily in air and without the need for adding special crosslinking agents and under these conditions operate at the highest photographic speed. The N-vinyl compounds listed in Table 1 (B) show equivalent speed providing the initial exposure to light and/or electron beams is made in the absence of oxygen. This is accomplished readily either by making the exposure in a vacuum frame, or by treating the surface with an atmosphere of flowing nitrogen or argon for at least 30 seconds prior to exposure.

The monomers listed in Table 1 (C), when part of the base composition, operate best in the absence of oxygen and again through the techniques defined in previous sentences. It is noted that some of the monomers in Table 1 (C) are liquids at room temperature and as such become part of the solvent system. The liquid type of monomers are normally retained in the fully deposited system in dry film form provided the system is not heated unduly prior to exposure and in many cases this is accomplished simply by permitting the wet photoresist solution to dry at room temperature. Because of the complications involved in using such liquid monomers, the solid varieties are preferred and these are marked with a star in Table 1 (C).

The monomers listed in Table 1 (C) may be used as complete substitutes for the N-vinyl compounds shown in Table 1. However, certain precautions need to be taken in connection with their use, particularly if the substitution for the items in Table 1 is a complete one. These monomers are most effective in an oxygen-free atmosphere, particularly with regard to photographic speed. The use of these monomers in an oxygen containing atmosphere slows down the photographic speed drastically by virtue of the presence of an induction period. In addition, while they can be used alone, without special hardeners, their activity is much improved by the deliberate addition of small percentages of crosslinking agents in the range of 0.5 to 3 percent of the amount of the monomer of the type listed in Table 1 (C). The crosslinking agents which are most effective for this purpose are listed in Table 3. In addition to the foregoing, and again particularly when the ethylenically unsaturated compound added to the composition is comprised solely of materials taken from Table 1 (C), the desired photochemical reaction is accelerated and made more efficient by the addition of an acyloin as defined in Table II of U.S. Pat. No. 3,330,659.

Table 3

Crosslinking Agents

U.S. Pat. No. 3,330,659

1. Glyceryl trimethacrylate
2. Diethyl maleate
3. Allyl anthranilate
4. Neopentylglycoldimethacrylate
5. N,N'-hexamethylenebisacrylamide
6. N,N'-methylenebisacrylamide
7. Ethylene dimethacrylate
8. N,N'-diallyl aniline

II ACTIVATOR

Activators include (1) organic halogen compounds in which at least three halogen atoms (Cl, Br or I) are attached to a single carbon atom as described in U.S. Pat. Nos. 3,042,515; 3,042,516; 3,042,517; 3,056,678 and others, (2) Sulfonyl and Sulfenyl halides described in U.S. Pat. No. 3,113,024; and (3) Mercapto compounds described in U.S. Pat. Nos. 3,285,744; 3,359,105 and in other patents.

The disclosures of these compounds in these patents are intended to be incorporated herein by reference.

The organic halogen compounds which may be incluaed in the light sensitive compositions to which the present invention is applicabe are those represented by the general formula A—C—$X_3$, wherein A represents halogen (Cl, Br, or I), alkyl, substituted alkyl, including halogen substituted alkyl, aryl, substituted aryl, aroyl, and aralkyl; and each X represents a halogen atom which may be either chlorine, bromine or iodine; it being understood that not all of the X atoms need be alike. Iodine is a preferred X and some of the preferred compounds are $CHI_3$,$CI_4$,$C_2I_6$.

The sulfur-containing activator compounds which may be included in the light sensitive compositions to which the present invention is applicable are those represented by the formula $R_1$—SH or $R_1$—S—S—$R_1$, wherein each $R_1$ represents an aryl or heterocyclic ring. Suitable compounds include 2-mercaptobenzothiazole, 5-methoxy-2-mercaptobenzothiazole, pentachlorothiobenzene.

Activator compounds containing both halogen and sulfur are suitable for this invention and are described in U.S. Pat. No. 3,113,024. Compounds such as 2-4-dinitrobenzene sulfonyl chloride, p-chlorobenzene sulfonyl chloride, pentachlorobenzene sulfenyl chloride are suitable.

III STABILIZER

The compositions of this invention also include an alkaline material which acts as a stabilizer. The base may be either organic or inorganic or a mixture of organic and inorganic materials may be included in the composition for this purpose.

Suitable organic amines include phenolic compounds such as those described in U.S. Pat. No. 3,351,467 and may be represented by the general formula

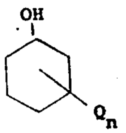

wherein Q may represent one or more hydroxyl groups or amino groups or alkyl or allyl groups, and $n$ is an integer not less than 1 and not greater than 5. When $n$ is greater than 1, all of the Q's used need not be the same. Examples are p-aminophenol, catechol, 2,4-ditertpentylphenol, 2,5-bis (1-1-dimethylpropyl) hydroquinone, 2,6-diterbutyl-p-phenol, tertbutylhydroxyanisole, etc.

Other organic amines or weakly alkaline inorganic compounds may be used in place of, or in addition to the phenolic compounds noted above.

IV RESIN BINDER

All of the resins listed in section IV have one unusual characteristic in common, namely a good degree of solubility in alcohols taken from the group methyl, ethyl, and propyl and a limited degree of solubility in the alcohol azeotropes with water. The solubility is clear cut and no evidence of swelling takes place when such dissolving of the resin occurs as a consequence of immersion in such solvents. In other words, these materials dissolve exactly as crystalline materials do in water. This lack of swelling is an exceptionally important characteristic for retaining resolution and for ensuring dimensional accuracy of the stencil after exposure to light, development and etching. In addition, all of these alcohol soluble resins of non-swellable character in alcohol apparently undergo a reaction with the N-vinylamine, which is probably crosslinking, which makes them equally resistant without swelling to exceptionally strong agents whether of alkaline or acid nature of the type normally used for the preparation of etched patterns. It is this lack of swelling, both in the solvents used for removal of the unexposed resist, and the etching that makes this particular class of resins unique. In addition, when co-polymers are involved these must be true co-polymers and cannot be simply mixtures. For example, impure polyvinylacetate which was the normal type of polyvinylacetate which was available in the marketplace up to 2 to 4 years ago, always contained an admixture of partially hydrolyzed vinylacetate in the form of polyvinylalcohol and this material swells when treated with alcohol. However, if the material is fully co-polymerized as is the case with the vinylacetate-vinylalcohol item represented as B under Section 7 on page 1, the type of swelling referred to in alcohol does not occur. The same is true of all of the other types of agents. Strangely enough, it has been found that if the vinyl esters are very pure, do not contain any admixtures of other vinyl compounds, particularly polyvinylalcohol, they also exhibit the same peculiar characteristic of dissolving in alcohols without the advent of swelling. This is particularly true of the vinylacetate resin listed in Example 1 which is 100 percent pure polyvinylacetate and the polyvinylpropionate which is 100 percent pure polyvinylpropionate and of the polysulfone which is listed in Example 5.

The I, II, and III constituents are dispersed or dissolved in a synthetic resin binder of specific characteristics, namely a resin which is soluble in an alcohol or in an azeotrope of an alcohol and water.

In addition to the above, the above, the compositions may include one or more additional compounds added for specific benefits. The use of such additional constituents is to be understood to be optional, and merely to confer additional advantages to the compositions which constitute the invention.

V. ANTIFOGGING AGENTS

An optional additional substituent which is useful in the composition of this invention is a triaryl compound of Sb, As, Bi, or P; triplenylstibine being a particularly preferred compound. Suitable compounds include those described in U.S. Pat. No. 3,377,167.

VI. COLOR FORMING COMPOUND

Further, a color forming compound may be added as an optional constituent.

Color-forming compounds useful in the present invention are those set forth in U.S. Pat. No. 3,042,515 and include leuco crystal violet, leuco opal blue, leuco malachite green, leuco xanthenes, leuco anthracenes, leuco cyanides, and numerous other leuco compounds of similar structure usually having a central carbon atom to which two or three aryl groups are attached as in the di- and tri-aryl methane derivatives, or which forms a portion of a heterocyclic ring in a fused ring compound such as the xanthenes, thioxanthenes, acridenes, anthracenes, and the like.

Within the context of the term leuco compound is included the alkyl and allyl ethers of the compounds given in the preceding paragraph.

Styryl and cyanine dye bases suitable for the present invention are described in U.S. Pat. Nos. 3,100,703; 3,102,810; 3,095,303 and suitable merocyanine dye bases described in U.S. Pat. No. 3,109,736.

The color-forming compounds give the photoresist the ability to form contrasting color when exposed to light.

VII SENSITIZERS

Sensitizers may be added to enhance the sensitivity of the composition to radiation of specific wavelengths. Suitable sensitizers include rubrene, Rhodanine dyes, cyanine and merocyanine dyes.

The relative proportions of the several ingredients in the compositions of this invention may be varied within the following limits:

Composition Ranges

| Constituents | Parts by Weight |
|---|---|
| 1. Polymerizable monomer | 15 to 150 |
| 2. Stabilizer | 1 to 100 |
| 3. Activator | |
| Organic halogen | 15 to 300 |
| Sulfonyl and sulfenyl halides | 1 to 100 |
| Mercapto compounds | 1 to 100 |
| 4. Triaryl compounds (optional) | .1 to 10 |
| 5. Color-forming compound (optional) | .01 to 10 |
| 6. Sensitizer (optional) | 1 to 25 |
| 7. Solvents | 50 to 10,000 |
| 8. Binder | 30 to 3,000 |

Suitable solvents are those in which the binder and constituents dissolve and include common organic solvents such as toluene and other hydrocarbons, acetone and other ketones, and will be apparent from a reading of the patents noted above.

Compositions of this invention should be prepared from pure starting materials. Commercially available materials may be further purified if necessary. For many compositions, preparation under yellow bug lights or Wratten OA safelight filters are satisfactory. For others it is necessary to prepare under red safelights or in total darkness when the composition is sufficiently sensitive.

After preparation the photosensitive solution is applied to a clean surface by any of the conventional methods used for applying photoresist solutions. The coating is then air dried or placed in an oven at elevated temperature e.g. between 70° and 90°C to remove the solvents, the drying time usually being less than 1 minutes. The dried surface is then exposed to suitable radiataion, e.g. to a mercury light or to visible light if a sensitizer has been added to the photoresist solution. After exposure, the sample is heated to complete the polymerization initiated in the exposed portions of the sample. The polymerization initiated by the light exposure is then completed by a short heating step in the range of 120° to 200°C, it requiring approximately 2 minutes to complete the insolubilization and total polymerization of the exposed areas at a temperature of 120°C and 10 to 15 seconds (closer to 10) when heated as high as 200°C. This heating step not only exaggerates the polymerization which is initiated by light but also fixes the composition so it is no longer sensitive to light. Complete exposure is obtained in a speed range of 5 to 20 millijoules per square centimeter when the visible is utilized and when the system is suitably sensitized to the visible with the types of sensitizers indicated elsewhere. If the material does not contain these visible light sensitizers and is exposed to the ultraviolet in a wavelength range between 3000 A and 4000 A, then the photographic speed is generally 3 to 5 times faster than that exhibited in the visible with a consequence that all of the examples given in the description which do not contain an optical sensitizer to the visible then exhibit a photographic speed in the range of 1 to 5 millijoules. Thus, these compositions are 1 to 2 orders of magnitude faster than other negative working photoresists, or to put it in specific numbers a factor of 10 to 1000 times faster than other photoresists, 10 being much on the low side and with the indication that the range is actually 100 to 1000 times faster. The sample is then developed with methanol or N-propanol-water azeotropic mixture. This development removes the unexposed material from the sample. After development, the sample is ready to be etched with any solution desired to remove portions of the sample not protected by the photoresist.

Heretofore with prior art resists utilizing a binder which is soluble in alcohol initially, and then is insolubilized as a consequence of the exposure and heating step, development of the exposed resist with alcohol, the exposed resist tends to swell but not dissolve in the alcohol or alcohol-water containing material. When it dries back down again the image is somewhat distorted and sometimes cracks appear in the resist particularly at the edges which are so important for the maintenance of proper definition of the ostensible pattern thus developed. However, in the case of the binders utilized in the present invention, this type of swelling, plus dimensional distortion does not occur and extraordinarily sharp renditions are available whether the resist is thick or thin, the renditions being sharper, the thinner the resist.

After etching, the exposed photoresist is removed from the sample with a chlorinated solvent selected from the group consisting of methylenedichloride, ethylenedichloride, trichlorethylene, perchlorethylene, and mixtures thereof.

Table I

| Example* | Binder(40gm) | Solvent(760 gm) |
|---|---|---|
| 1 | Bakelite AYAC (Polyvinylacetate) | Acetone |
| 2 | Bakelite T-24-9 (Vinyl alcohol vinyl acetate copolymer) | Toluene |
| 3 | Bakelite XYHL (Vinyl butyral polyvinyl alcohol-polyvinyl acetate copolymer) | Cellosolve |
| 4 | Bakelite VYHH (Vinyl chloride-vinyl acetate copolymer) | |
| 5 | Bakelite 251 (Polyketone resin) | |
| 6 | Bakelite SKD 3955 (Copolymer polyvinylketone-polystyrene) | |

*
includes 22.5 parts by weight N-vinyl carbazole
includes 15 parts by weight 2,6-Diterbutyl-p-cresol
includes 15 parts by weight iodoform

I claim:

1. The process which comprises:

preparing a solution of a photosensitive material in a solvent, said photosensitive material consisting essentially of the following materials;

1. at least one polymerizable N-vinyl monomer;
2. at least one activator for enhancing the effect of exposing said monomer to a suitable dose of electromagnetic radiation at least sufficient to initiate polymerization of said monomer, said activator being selected from the group consisting of: organic halogen compounds in which at least three halogen atoms from the groups consisting of Cl, Br and I are attached to a single carbon atom; sulfonyl chlorides, sulfonyl bromides, sulfenyl chlorides, sulfenyl bromides and mercapto compounds wherein the mercapto group is attached to a carbon atom in a heterocyclic nucleus; and
3. at least one substituted phenol represented by the general formula

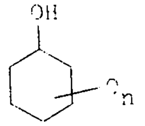

in which Q represents one or more hydroxyl groups, amino groups, alkyl or allyl groups and not all of the Q's need be the same, and *n* is an integer from 1 to 5; and 4. a resin which exhibits a good degree of solubility in an alkanol selected from the group consisting of methanol, ethanol and propanols and at least some solubility in the azeotrope of said alcohols and water;

coating the solution onto a solid substrate;

drying the coating;

photographically exposing the coating to suitable radiation;

heating to complete polymerization of the exposed portions of the coating; and developing the resulting resist with an alcohol or alcohol-water azeotrope.

2. The process of claim 1 in which the development alcohol is selected from the group consisting of methyl, ethyl, and propyl alcohols.

3. The process of claim 1 including subsequent removal of the polymerized coating by use of a chorinated alkaline.

* * * * *